United States Patent [19]

Kawanishi et al.

[11] Patent Number: 4,540,617
[45] Date of Patent: Sep. 10, 1985

[54] FABRIC ARTICLES HAVING A FLAME-RESISTANT COATING ON AT LEAST ONE SURFACE THEREOF

[75] Inventors: Toshio Kawanishi; Satoshi Hareyama, both of Tokyo, Japan

[73] Assignee: Teikoku Sen-I Co., Ltd., Tokyo, Japan

[21] Appl. No.: 676,232

[22] Filed: Nov. 29, 1984

[30] Foreign Application Priority Data

Aug. 22, 1984 [JP] Japan ................. 59-174776

[51] Int. Cl.³ .............................................. B32B 3/10
[52] U.S. Cl. .................................... 428/137; 428/131; 428/240; 428/260; 428/266; 428/283; 428/323; 428/324; 428/408; 428/447; 428/920
[58] Field of Search ............... 428/131, 137, 145, 240, 428/241, 242, 266, 324, 341, 447, 921, 408, 257, 323, 234, 235, 260, 920, 283

[56] References Cited

U.S. PATENT DOCUMENTS

| | | | |
|---|---|---|---|
| 3,032,442 | 5/1962 | Roth | 428/260 |
| 4,342,803 | 8/1982 | Stengle | 428/266 |
| 4,438,167 | 3/1984 | Schwarz | 438/260 |

*Primary Examiner*—James J. Bell
*Attorney, Agent, or Firm*—Birch, Stewart, Kolasch & Birch

[57] ABSTRACT

Fabric articles having a flame-resistant coating on at least one surface thereof, the fabric article comprising a flame-resistant, heat-resistant woven fabric made of carbon fibers and heat-resistant synthetic fibers and a silicone resin coating formed on at least one surface of the woven fabric, the fabric article having fine through-holes permitting the air to pass therethrough.

5 Claims, 1 Drawing Figure

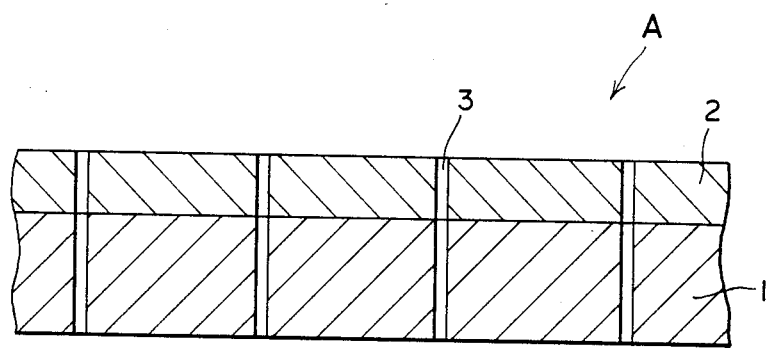

FABRIC ARTICLES HAVING A FLAME-RESISTANT COATING ON AT LEAST ONE SURFACE THEREOF

BACKGROUND OF THE INVENTION

1. Field of the Invention

This invention relates to flame-resistant fabric articles which are particularly useful as a fire blocking layer of aircraft seats provided between a face cloth and an inner polyurethane foam of the seats so as to wrap the polyurethane foam with the fabric article.

2. Description of the Prior Art

Extensive studies have been made to use flame-resistant, heat-resistant woven fabrics as the fire blocking layer. In order to impart a good flame-resistant performance to the woven fabrics, the fabrics must be adequately thick (e.g. 0.7–1.0 mm), thus presenting various problems with respect to economy, comfortability, sewability and the like. Especially, when the fabrics are used in aircraft, their weight is one of serious problems.

SUMMARY OF THE INVENTION

It is accordingly an object of the present invention to provide flame-resistant fabric articles which overcome the prior art problems and are most suitable for use as the fire blocking layer of aircraft seats.

The present invention provides a flame-resistant fabric article which comprises a flame-resistant, heat-resistant woven fabric made of carbon fibers and heat-resistant synthetic fibers and a silicone resin coating formed on at least one surface of the woven fabric, the fabric article having fine through-holes permitting air to pass therethrough.

Other objects, advantages and features of the present invention will become clear from the following description with reference to the accompanying drawing.

BRIEF DESCRIPTION OF THE DRAWING

A sole FIGURE is a sectional view of a flame-resistant processed fabric article according to the invention.

DETAILED DESCRIPTION AND EMBODIMENTS OF THE INVENTION

Reference is now made to the accompanying drawing, in which there is shown a flame-resistant processed fabric article A which comprises a flame-resistant, heat-resistant woven fabric 1 consisting of carbon fibers and heat-resistant synthetic fibers. On at least one side of the woven fabric 1 is formed a silicone resin coating 2. The coating-bearing fabric article A is provided with fine through-holes 3 as shown.

The flame-resistant, heat-resistant woven fabrics used in the practice of the invention are, for example, a plane weave or diagonal weave fabric having a weight of 120 to 160 g/m$^2$ and a thickness of 0.2 to 0.5 mm. The spun yarns for weaving the fabric are made of carbon fibers, e.g. semi-carbon fibers obtained by carbonizing polyacrylonitrile or rayon in air at temperatures of from 200° to 300° C., and heat-resistant synthetic fibers such as, for example, para-oriented aromatic polyamide fibers in a mixing ratio of 65:35 to 50:50 on the weight basis. The yarns should be preferably prepared to have a cotton count of about 20. These yarns are used as warps and wefts of the fabrics. Fabrics obtained by using twisted yarns may also be used.

The heat-resistant synthetic fibers may include, aside from the above para-oriented aromatic polyamide fibers, meta-oriented aromatic polyamide fibers, but the former fibers are preferred.

Woven fabrics made of 100% semi-carbon fibers or 100% para-oriented aromatic polyamide fibers may be used, but the woven fabric made of semi-carbon fibers alone is poor in flex and wear resistances, so that it is not durable. On the other hand, the woven fabric made of para-oriented aromatic polyamide fibers alone is poor in flame resistance and expensive. Accordingly, woven fabrics of union yarns or twisted yarns in the above mixing ratio are preferred.

The heat-resistant resins used as the coating on the woven fabrics include silicone resins, melamine resins and the like. Silicone resins to which inorganic fillers such as silica, mica, alumina, titanium oxide and the like are added are most suitable in view of good flame and heat resistances. The inorganic fillers are added to the silicone resin in suitable amounts, for example, of from 20 to 50 wt % of the resin. By the addition, the flame and heat resistances of the silicone resin can be much improved.

The resin is uniformly coated on one or both sides of the flame-resistant woven fabric in an amount of from 80 to 120 g/m$^2$ after drying. The thickness of the coated fabric should preferably be in the range of from 0.2 to 0.5 mm. Amounts less than 80 g/m$^2$ are unfavorable because of the insufficiency of the flame resistance, whereas amounts greater than 120 g/m$^2$ are not favorable because of no merit on weight saving.

The coated fabrics obtained above have a good flame resistance but no air permeability. This is very disadvantageous when the fabrics are used as a fire blocking layer of seats. This is because when one takes the seat particularly over a long time, one will feel objectionable due to the rise of temperature in the inside of the seat so that the seat becomes hot. In addition, when the seat is in flames, the polyurethane foam in the inside of the seat is gasified and the generated gas will expand the seat with a danger of breakage. To solve the problem, the coated fabrics are formed, by mechanical means such as a needle punch, with fine through-holes having a diameter of 0.01 to 0.03 mm which are uniformly distributed throughout the fabric at a rate of 150 to 250 holes per cm$^2$. The air permeability rate of such a fabric is controlled to be within a range of from 2 to 7 cc/cm$^2$/second when determined according to the method prescribed in JIS L 1096A. When the diameter of the fine holes exceeds the above defined range or the air permeability rate is higher, the flame-resistant performance lowers. At the air permeability rate below 2 cc/cm$^2$/second, air permeability is not adequate. Formation of the fine through-holes is advantageous in imparting a soft texture to the coated fabrics.

The resulting fabric articles not only have good flame resistance, but also are light, thin, air-permeable, soft and sewable. Although these articles are most suitable as the fire blocking layer of aircraft seats, they may also be used in the field of seats of vehicles and sofa for home use, linings of beds, specific types of heat-resistant protective suits and the like.

The present invention is particularly described by way of example.

EXAMPLE

Semi-carbon fibers and para-oriented aromatic polyamide fibers were mix-spun at a rate of 65:35 to make a 0.27 mm thick woven fabric. The fabric was coated with a silicone resin mixed with an inorganic filler in an amount of 90 g/m² with a total thickness of 0.25 mm. Through-holes were made in the thus coated fabric in different air permeability rates to obtain samples A, B and C.

The above samples A, B and C were used as a fire blocking layer to make seats. These seats were subjected to the combustion test using a large-size oil burner according to the new Fire Blocking Standard for aircraft seat, issued by the Aviation Bureau of the United States on Oct. 11, 1983, thereby measuring weight loss rates (1) of the seats. The results are shown below.

| Sample | Weight (g/m²) | Thickness (mm) | Air Permeability (cc/cm²/sec.) | Weight Loss Rate (%) |
|---|---|---|---|---|
| A | 220 | 0.29 | 3.7 | 8.3 |
| B | 220 | 0.29 | 15 | 15.0 |
| C | 220 | 0.29 | 1.7 | 12.0 |

In the above table, (1) Weight loss rate (%) = $\frac{\text{Weight loss of the seat after the combustion test}}{\text{Weight of the seat before the combustion test}}$ (2) Sample A is an embodiment of the invention and Samples B and C are control samples.
(3) The seats having weight loss rates below 10% are "pass".

As will be seen from the foregoing, the flame-resistant coated fabric articles of the present invention have a number of advantages that they are inexpensive, agreeable feeling to the touch, sewable, light in weight and flame-resistant.

What is claimed is:

1. A flame-resistant fabric article which comprises a flame-resistant, heat-resistant woven fabric made of carbon fibers and heat-resistant synthetic fibers and a silicone resin coating formed on at least one surface of the woven fabric, the fabric article having fine through-holes permitting air to pass therethrough.

2. The flame-resistant fabric article according to claim 1, wherein said woven fabric is a woven fabric of semi-carbon fibers and para-oriented aromatic polyamide having a basis weight of 120 to 160 g/m², said resin coating is formed on one surface of said woven fabric in an amount of 80 to 120 g/m², and the fine through-holes have a diameter of 0.01 to 0.03 mm so that an air permeability rate of the fabric article is in the range of 2 to 7 cc/cm²/second.

3. The flame-resistant fabric article according to claim 2, wherein the mixing ratio of said semi-carbon fibers to said para-oriented aromatic polyamide fibers is in the range of 65:35 to 50:50 on the weight basis.

4. The flame-resistant fabric article according to claim 1, wherein said silicone resin contains an inorganic filler in an amount of 20 to 50 wt % of said silicone resin.

5. The flame-resistant fabric article according to claim 2, wherein said silicone resin contains an inorganic filler in an amount of 20 to 50 wt % of said silicone resin.

* * * * *